(12) United States Patent
Pandey et al.

(10) Patent No.: US 10,887,451 B2
(45) Date of Patent: Jan. 5, 2021

(54) METHOD AND SYSTEM FOR PROVIDING BACKUP PUSH-TO-TALK FUNCTION IN STUCK MICROPHONE CONDITION

(71) Applicant: Honeywell International Inc., Morris Plains, NJ (US)

(72) Inventors: Vivek Kumar Pandey, Sultanpur (IN); Supriya Mallick, Bangalore (IN); Saravanakumar Gurusamy, Coimbatore (IN)

(73) Assignee: Honeywell International Inc., Charlotte, NC (US)

( * ) Notice: Subject to any disclaimer, the term of this patent is extended or adjusted under 35 U.S.C. 154(b) by 15 days.

(21) Appl. No.: 16/173,349

(22) Filed: Oct. 29, 2018

(65) Prior Publication Data

US 2020/0137218 A1   Apr. 30, 2020

(51) Int. Cl.
| | |
|---|---|
| *H04W 4/10* | (2009.01) |
| *H04M 3/12* | (2006.01) |
| *H04M 3/20* | (2006.01) |
| *H04B 7/185* | (2006.01) |
| *G06F 3/041* | (2006.01) |

(52) U.S. Cl.
CPC ............ *H04M 3/12* (2013.01); *G06F 3/0416* (2013.01); *H04B 7/18506* (2013.01); *H04M 3/20* (2013.01); *H04W 4/10* (2013.01)

(58) Field of Classification Search
None
See application file for complete search history.

(56) References Cited

U.S. PATENT DOCUMENTS

| | | | |
|---|---|---|---|
| 4,366,578 A | 12/1982 | Foster et al. | |
| 4,551,854 A | 11/1985 | Rutty et al. | |
| 4,932,071 A | 6/1990 | Arndt et al. | |
| 6,826,463 B2 | 11/2004 | Nakamura | |
| 7,236,749 B2 | 6/2007 | Reyes | |
| 9,158,496 B2 | 10/2015 | Soffer | |
| 2005/0085252 A1* | 4/2005 | Reyes | G08G 5/0013 455/519 |
| 2007/0254606 A1 | 11/2007 | Dunko | |
| 2013/0231055 A1* | 9/2013 | Leroux | H04M 1/6066 455/41.2 |
| 2014/0274180 A1 | 9/2014 | DuBois et al. | |
| 2016/0309413 A1 | 10/2016 | Sabatino | |

\* cited by examiner

*Primary Examiner* — Mansour Oveissi
(74) *Attorney, Agent, or Firm* — Fogg & Powers LLC

(57) ABSTRACT

A method and system provide a backup push-to-talk (PTT) function for a transmitter in a stuck microphone condition. The method determines whether a stuck microphone condition exists in the transmitter, and if the stuck microphone condition exists, the method alerts a user that the stuck microphone condition exists. The method then enables a backup PTT interface for the transmitter such that a backup PTT button is available to the user to activate the backup PTT function. The method alerts the user when the backup PTT function is activated, and sends a message to a receiver after the backup PTT button is engaged by the user.

18 Claims, 5 Drawing Sheets

METHOD AND SYSTEM FOR PROVIDING BACKUP PUSH-TO-TALK FUNCTION IN STUCK MICROPHONE CONDITION

BACKGROUND

There are various ways for identifying and handling a stuck microphone condition in a communication system for a vehicle such as an aircraft. A push-to-talk (PTT) switch is a mechanical switch, which is prone to cause the stuck microphone condition when the switch fails to operate properly. In addition, the stuck microphone condition can occur if the PTT switch to the radio/audio panel connection is grounded.

When the stuck microphone condition occurs, certain systems have provision for a stuck microphone time-out. For example, a stuck microphone time-out mechanism can include a transmitter-disabling mechanism that is connected to the microphone switch circuit for limiting any transmission to a predetermined duration, even though the microphone switch circuit is activated for a longer duration. However, this mechanism keeps the microphone unusable if the source of the stuck microphone problem is from the mechanical switch, or the discrete line from the mechanical switch to the radio/audio panel. If a pilot does not have an alternate microphone (e.g., hand microphone), then voice communication to/from the aircraft is impossible.

SUMMARY

A method and system provide a backup push-to-talk (PTT) function for a transmitter in a stuck microphone condition. The method determines whether a stuck microphone condition exists in the transmitter, and if the stuck microphone condition exists, the method alerts a user that the stuck microphone condition exists. The method then enables a backup PTT interface for the transmitter such that a backup PTT button is available to the user to activate the backup PTT function. The method alerts the user when the backup PTT function is activated, and sends a message to a receiver after the backup PTT button is engaged by the user.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for providing a backup push-to-talk (PTT) function for a stuck microphone condition is described herein. The backup PTT function provides a significant additional failure reversion mode, using displays or radio controllers for communication transmit activation in the event of a PTT switching failure. This arrangement will ensure an alternative path for the PTT signal from an audio panel to a transceiver, and provides an alternative to carrying another PTT microphone (e.g., hand-held PTT).

The backup PTT function is a momentary function, similar to the function of a PTT switch on a microphone, but can be implemented, for example, on a touchscreen or via a softkey using a backup PPT button, and via a data bus control of a radio, rather than a discrete input. When activated, the backup PPT button is used to override a stuck microphone condition to the radio.

In addition, present method and system can provide a user option to change a time-out duration for a stuck microphone time-out mechanism. For example, the stuck microphone time-out mechanism can be altered by reducing the time-out value to disable transmission in case of a stuck microphone condition. In some cases, such as in an emergency, the time-out value can be increased to continue the transmission beyond a predefined time-out value, but not beyond the maximum hardware endurance limit.

Further details of various embodiments are described hereafter with reference to the drawings.

Figure 1:
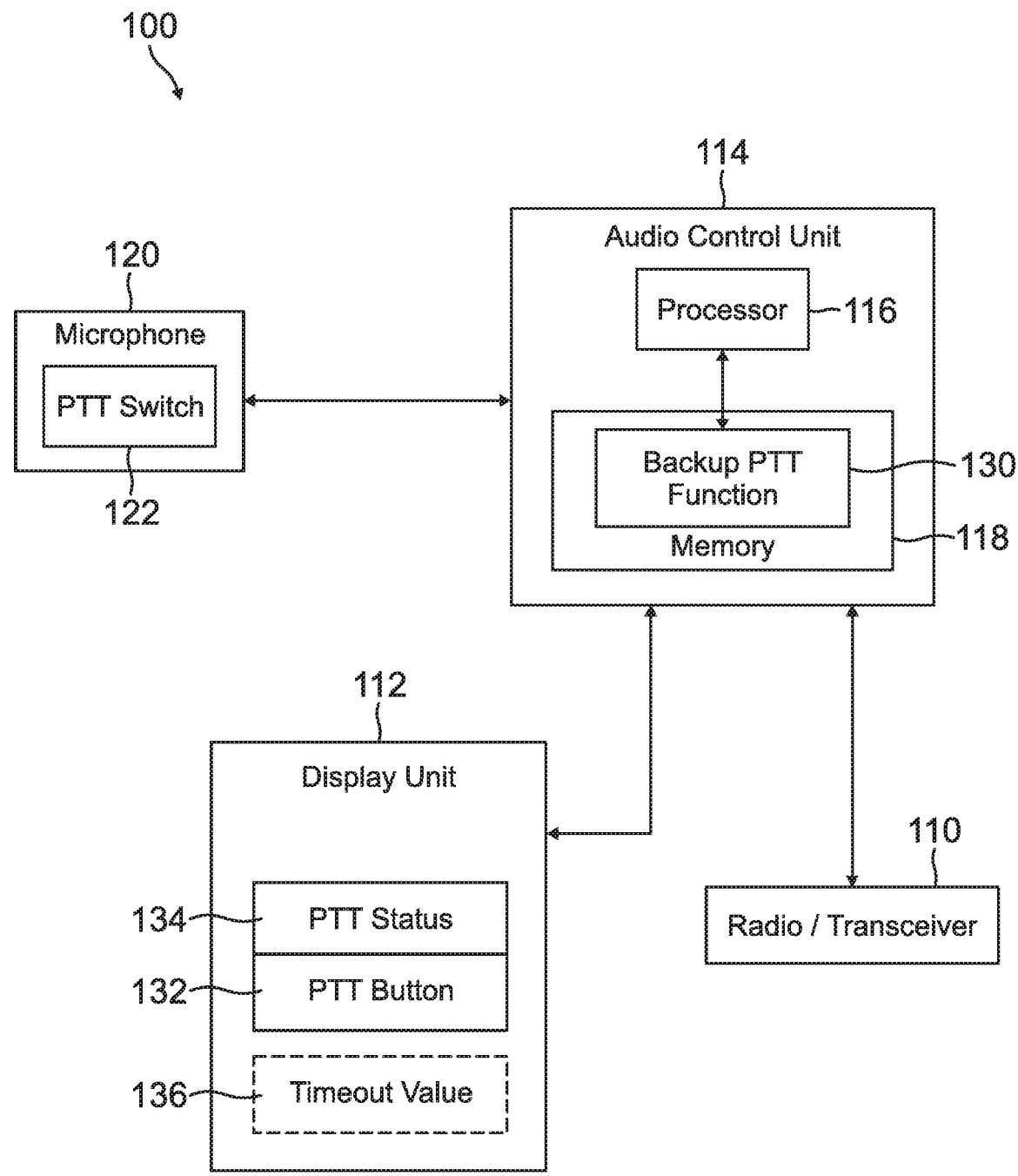
FIG. 1 is a block diagram of a communication system, according to one embodiment, in which a backup push-to-talk (PTT) function is implemented.

FIG. 1 illustrates a communication system 100 according to one embodiment, in which the present approach may be implemented. The system 100 generally includes at least one radio or transceiver 110, and an interface such as a display unit 112, each operatively coupled to an audio control unit 114 that includes at least one processor 116 and at least one memory unit 118. A microphone 120 for a user operatively communicates with audio control unit 114, and microphone 120 includes a PTT switch 122. The audio control unit 114 is configured to receive the PTT and audio signals from microphone 120.

The system 100 is implemented with a backup PTT function 130, stored as digital logic in memory unit 118, for when a stuck condition of microphone 120 is identified by audio control unit 114 and a transmitter coupled to microphone 120 is disabled. In such a condition, a specific button or set of buttons can be identified on certain devices (interfaces) that allow the user to activate backup PTT function 130. For example, a PTT button 132, such as a soft button, can be associated with display unit 112, along with a PTT status indicator 134 viewable by the user. A user option to change a time-out value 136 for the transmitter can also be associated with display unit 112.

When backup PTT function 130 is activated, a 'press and hold' of PTT button 132 by the user sends a TRANSCEIVER-ON command to a selected transceiver 110 having a disabled transmitter. The transceiver 110 returns to standby when PTT button 132 is released by the user.

In other embodiments, the PTT button (or set of buttons) can be implemented on various other devices, such as with a hardware button on an audio panel, or a soft button on a Touch Screen Controller (TSC), for example. In some implementations, the backup PTT button can be an existing hardware button that is reconfigurable as the backup PTT button when the stuck microphone condition exists.

In further embodiments, the backup PTT button can be located on a screen of a connected device, such as a handheld or wearable device, which is used as a backup PTT interface. Examples of such connected devices include tablets, smart phones, smart watches, electronic flight bags (EFBs), or the like.

The present system can be implemented with a transmitter that is located in a vehicle, in handheld communication equipment (e.g., walkie-talkie), or in a built-in communication sub-system that is part of another system (e.g., call sub-system in an elevator). In various embodiments, the backup PTT button can be associated with a display unit that is in a vehicle, in handheld communication equipment, or is part of a built-in communication sub-system.

Figure 2:
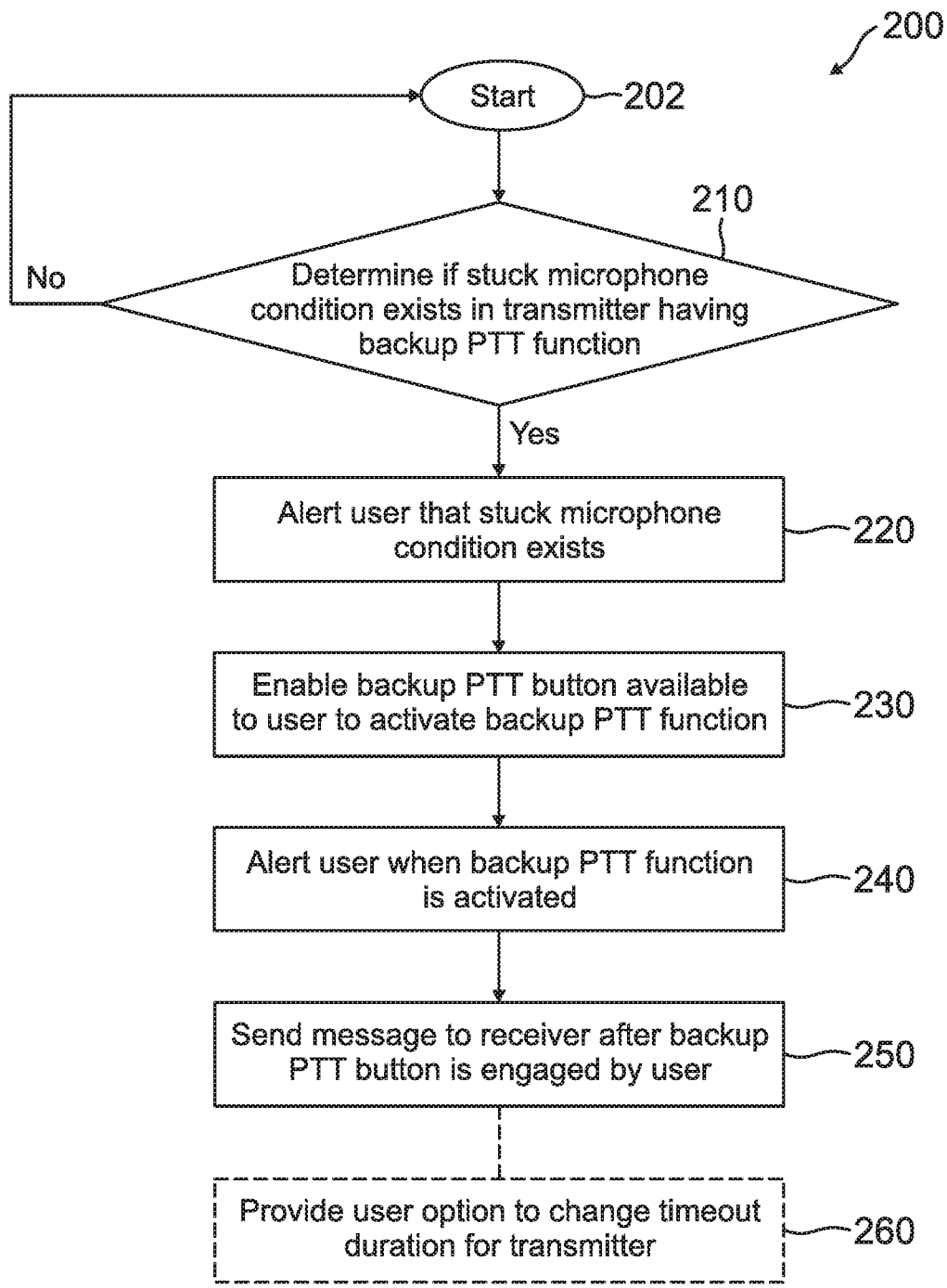
FIG. 2 is a process flow diagram of a method for operating a backup PTT function, such as for the system of FIG. 1.

FIG. 2 is a process flow diagram of a method 200 for operating a backup PTT function, such as for a transmitter in system 100. Commencing with Start 202, the method 200 determines if a stuck microphone condition exists in the transmitter having the backup PTT function (block 210). If yes, a user is alerted that the stuck microphone condition exists (block 220), such as with an audio or visual alert. The method 200 then enables a backup PTT interface for the transmitter, such that a backup PTT button is available to the user to activate the backup PTT function (block 230). The user is then alerted, such as with a visual status indicator, when the backup PTT function is activated (block 240). A message can then be sent to a receiver after the backup PTT button is engaged by the user (block 250). The method 200 can also provide a user option to change a time-out duration for the transmitter (block 260).

In the present approach, the backup PTT button(s) is enabled only when the stuck microphone condition is detected. This is especially important for hardware buttons that already perform certain functions. For example, a menu button on a particular controller, which brings up the main menu, can be identified as a backup PTT button. When the menu button is pressed and held, the menu button will act as the backup PTT button only when the stuck microphone condition is detected. The status of whether the backup PTT button is pressed and active (or not) can be annunciated on a display device.

Figure 3:
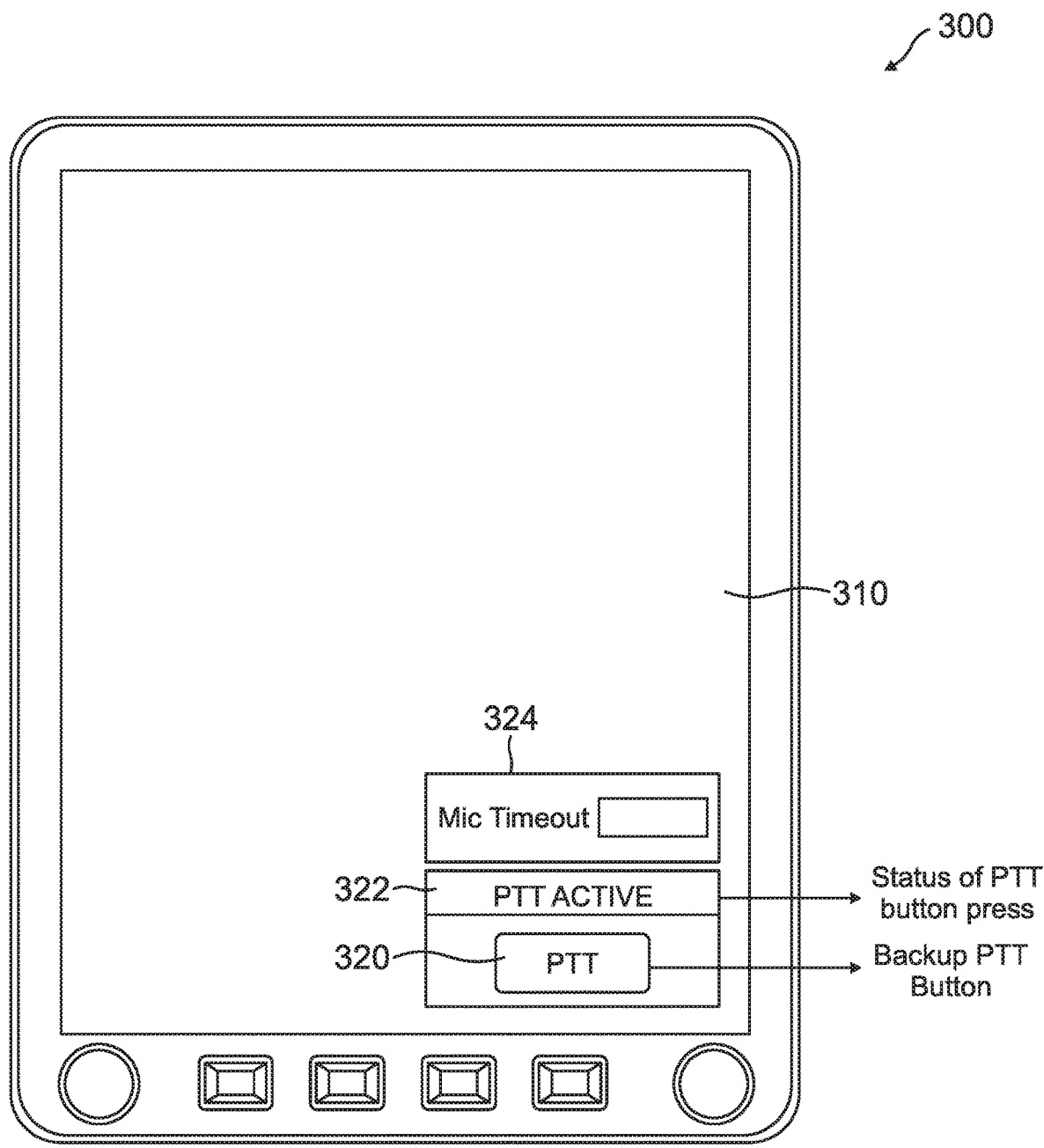
FIG. 3 illustrates an exemplary implementation of a touch screen controller configured with an on-screen backup PTT button.

In addition, soft buttons can be implemented as backup PTT buttons to enable voice communication in case of a stuck mechanical PTT button. FIG. 3 illustrates an exemplary implementation of a TSC 300 that is configured with an on-screen backup PPT button 320 that is a soft button. The backup PPT button 320 is shown on a display screen 310 of TSC 300 when a stuck microphone condition is detected. A status indicator 322 on display screen 310 shows whether the backup PTT button is pressed and active ("PTT ACTIVE"). A user input option 324 to change a microphone time-out value ("Mic Timeout") for the transmitter can also be shown on display screen 310.

Figure 4:
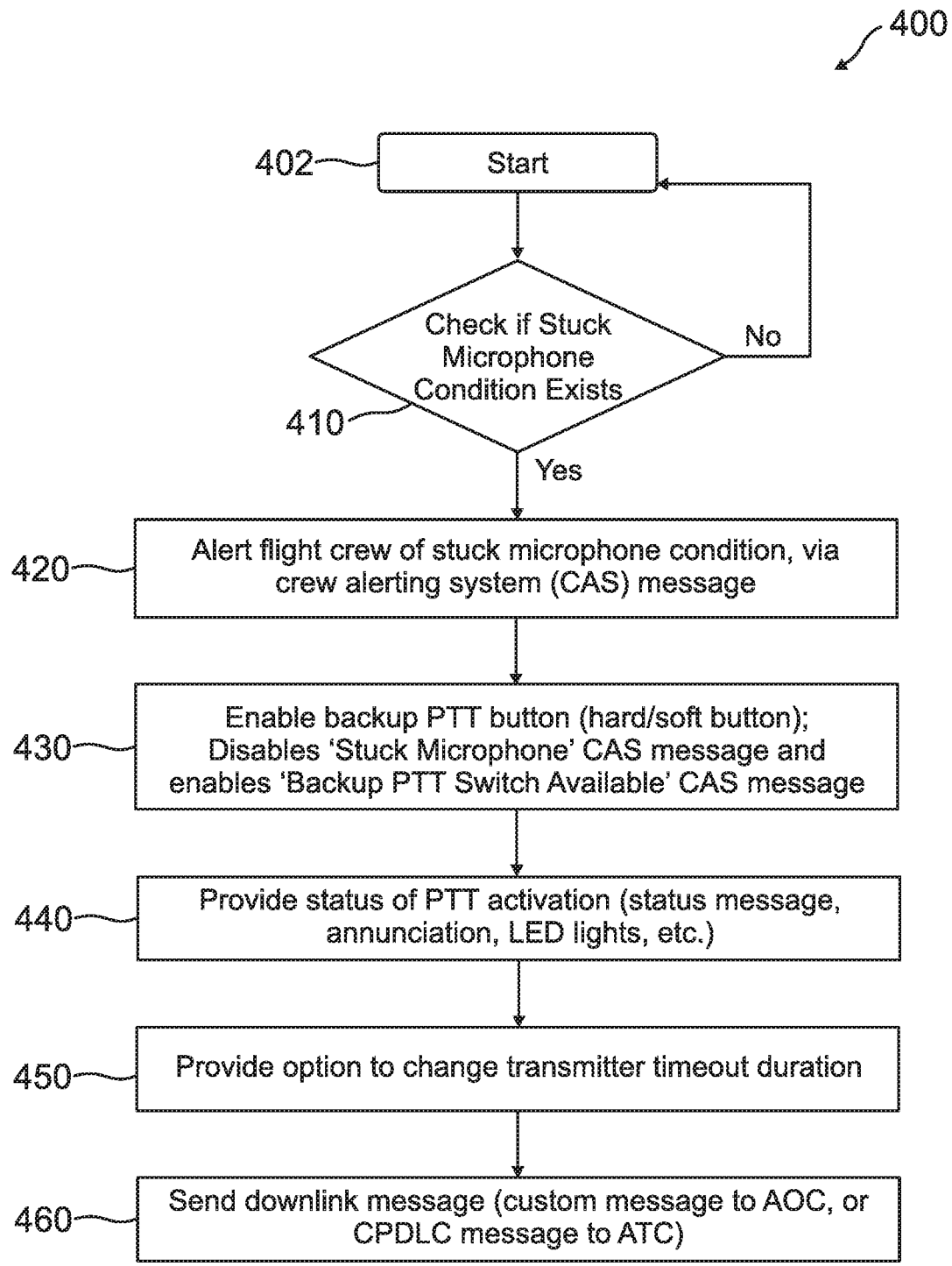
FIG. 4 is a process flow diagram of a method for operating a backup PTT function in an aircraft.

The present approach for providing a backup PTT function for a stuck microphone condition is particularly useful for a communication system in an aircraft. FIG. 4 is a process flow diagram of a method 400 for operating a backup PTT function in an aircraft. Commencing with Start 402, the method 400 checks if a stuck microphone condition exists in the transmitter having the backup PTT function (block 410). If yes, the flight crew is alerted that the stuck microphone condition exists, such as with a crew alerting system (CAS) message (block 420). The method 400 then enables a backup PTT button, such as a hard or soft button, which disables a 'Stuck Microphone' CAS message and enables a 'Backup PTT Switch Available' CAS message (block 430). The flight crew is then provided with a status of the PTT activation, such as with a status message, annunciation, light emitting diode (LED) lights, or the like (block 440). The method 400 can also provide an option to the flight crew to change a transmitter time-out duration (block 450). An automatic downlink message can then be sent, for example, such as a custom message to Aeronautical Operational Control (AOC), or a controller pilot datalink communications (CPDLC) message to Air Traffic Control (ATC) (block 460).

Figure 5:
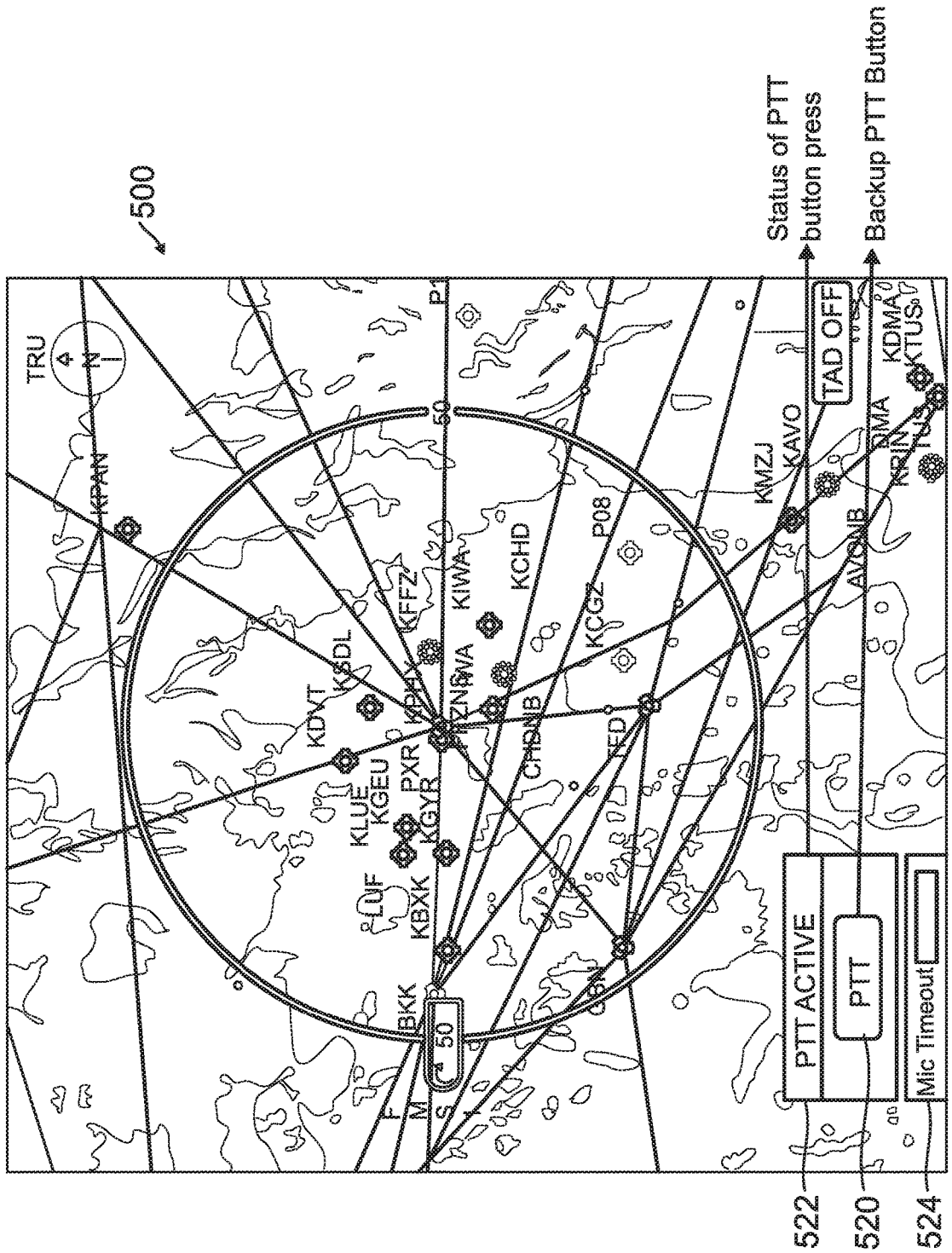
FIG. 5 illustrates an exemplary implementation of an avionics navigation display configured with an on-screen backup PTT button.

FIG. 5 illustrates an exemplary implementation of an avionics navigation display 500 configured with an on-screen backup PPT button 520 that is a soft button. The backup PPT button 520 is shown on display 500 when a stuck microphone condition is detected. A status indicator 522 on display 500 shows whether the backup PTT button is pressed and active ("PTT ACTIVE"). A pilot input option 524 to change a microphone time-out value ("Mic Timeout") can also be shown on display 500.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system and method.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the method described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method comprising: providing a backup push-to-talk (PTT) function for a transmitter; determining whether a stuck microphone condition exists in the transmitter; if the stuck microphone condition exists, alerting a user that the stuck microphone condition exists; enabling a backup PTT interface for the transmitter such that a backup PTT button is available to the user to activate the backup PTT function; alerting the user when the backup PTT function is activated; and sending a message to a receiver after the backup PTT button is engaged by the user.

Example 2 includes the method of Example 1, further comprising providing an option to the user to change a time-out duration for the transmitter.

Example 3 includes the method of any of Examples 1-2, wherein the backup PTT button comprises an existing hardware button that is reconfigurable as the backup PTT button when the stuck microphone condition exists.

Example 4 includes the method of any of Examples 1-2, wherein the backup PTT button comprises a soft button located on a screen of a display unit, or on a touch screen controller (TSC) display.

Example 5 includes the method of any of Examples 1-4, wherein the transmitter is located in a vehicle, handheld communication equipment, or a built-in communication sub-system.

Example 6 includes the method of Example 5, wherein the backup PTT button is associated with a display unit that is: in the vehicle, in the handheld communication equipment, or is part of the built-in communication sub-system.

Example 7 includes the method of Example 6, wherein the backup PTT button comprises a soft button located on a screen of the display unit.

Example 8 includes the method of Example 7, wherein the display unit comprises a navigation display.

Example 9 includes the method of any of Examples 1-4, wherein the backup PTT button is located on a screen of a connected device comprising a handheld device or a wearable device.

Example 10 includes the method of any of Examples 1-9, wherein the user is alerted when the backup PTT function is activated by a PTT status indicator viewable by the user on a display unit.

Example 11 includes a system, comprising: an audio control unit that includes a processor and a memory unit; at least one transmitter in a radio or transceiver operatively coupled to the audio control unit; a display unit operatively coupled to the audio control unit; a microphone in operative communication with the audio control unit, the microphone including a push-to-talk (PTT) switch for a user; wherein the processor is operative to execute instructions stored in the memory unit to perform a method comprising: providing a backup PTT function for the transmitter; determining whether a stuck microphone condition exists; if the stuck microphone condition exists, alerting the user that the stuck microphone condition exists; enabling a backup PTT interface for the transmitter such that a backup PTT button is available to the user to activate the backup PTT function; alerting the user when the backup PTT function is activated; and sending a message to a receiver after the backup PTT button is engaged by the user.

Example 12 includes the system of Example 11, wherein the processor is operative to execute instructions to perform the method further comprising: providing an option to the user to change a time-out duration for the transmitter.

Example 13 includes the system of any of Examples 11-12, wherein the backup PTT button comprises a hardware button.

Example 14 includes the system of any of Examples 11-12, wherein the backup PTT button comprises a soft button located on a screen of the display unit comprising a touch screen controller (TSC) display.

Example 15 includes the system of any of Examples 11-14, wherein the transmitter and display unit are located in an aircraft.

Example 16 includes the system of Example 15, wherein the backup PTT button is associated with the display unit in the aircraft.

Example 17 includes the system of Example 16, wherein the backup PTT button comprises a soft button located on a screen of the display unit.

Example 18 includes the system of Example 16, wherein the display unit comprises an avionics navigation display.

Example 19 includes the system of any of Examples 11-18, wherein the message sent to the receiver after the backup PTT button is engaged comprises an automatic downlink message.

Example 20 includes the system of any of Examples 11-19, wherein the user is alerted when the backup PTT function is activated by a PTT status indicator viewable by the user on the display unit.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:
providing a backup push-to-talk (PTT) function for a transmitter;
determining whether a stuck microphone condition exists in the transmitter;
if the stuck microphone condition exists, alerting a user that the stuck microphone condition exists;
enabling a backup PTT interface for the transmitter such that a backup PTT button is available to the user to activate the backup PTT function;
alerting the user when the backup PTT function is activated; and
sending a message to a receiver after the backup PTT button is engaged by the user;
wherein a user input to change a microphone time-out duration value for the transmitter is displayed.

2. The method of claim 1, wherein the backup PTT button comprises an existing hardware button that is reconfigurable as the backup PTT button when the stuck microphone condition exists.

3. The method of claim 1, wherein the backup PTT button comprises a soft button located on a screen of a display unit, or on a touch screen controller (TSC) display.

4. The method of claim 1, wherein the transmitter is located in a vehicle, handheld communication equipment, or a built-in communication sub-system.

5. The method of claim 4, wherein the backup PTT button is associated with a display unit that is: in the vehicle, in the handheld communication equipment, or is part of the built-in communication sub-system.

6. The method of claim 5, wherein the backup PTT button comprises a soft button located on a screen of the display unit.

7. The method of claim 6, wherein the display unit comprises a navigation display.

8. The method of claim 1, wherein the backup PTT button is located on a screen of a connected device comprising a handheld device or a wearable device.

9. The method of claim 1, wherein the user is alerted when the backup PTT function is activated by a PTT status indicator viewable by the user on a display unit.

10. A system, comprising:

an audio control unit that includes a processor and a memory unit;

at least one transmitter in a radio or transceiver operatively coupled to the audio control unit;

a display unit operatively coupled to the audio control unit;

a microphone in operative communication with the audio control unit, the microphone including a push-to-talk (PTT) switch for a user;

wherein the processor is operative to execute instructions stored in the memory unit to perform a method comprising:

providing a backup PTT function for the transmitter;

determining whether a stuck microphone condition exists;

if the stuck microphone condition exists, alerting the user that the stuck microphone condition exists;

enabling a backup PTT interface for the transmitter such that a backup PTT button is available to the user to activate the backup PTT function;

alerting the user when the backup PTT function is activated; and sending a message to a receiver after the backup PTT button is engaged by the user;

wherein a user input to change a microphone time-out duration value for the transmitter is shown on the display unit.

11. The system of claim 10, wherein the backup PTT button comprises a hardware button.

12. The system of claim 10, wherein the backup PTT button comprises a soft button located on a screen of the display unit comprising a touch screen controller (TSC) display.

13. The system of claim 10, wherein the transmitter and display unit are located in an aircraft.

14. The system of claim 13, wherein the backup PTT button is associated with the display unit in the aircraft.

15. The system of claim 14, wherein the backup PTT button comprises a soft button located on a screen of the display unit.

16. The system of claim 14, wherein the display unit comprises an avionics navigation display.

17. The system of claim 10, wherein the message sent to the receiver after the backup PTT button is engaged comprises an automatic downlink message.

18. The system of claim 10, wherein the user is alerted when the backup PTT function is activated by a PTT status indicator viewable by the user on the display unit.

* * * * *